US008402056B2

(12) United States Patent
Witkowski et al.

(10) Patent No.: US 8,402,056 B2
(45) Date of Patent: *Mar. 19, 2013

(54) RESOLVING, PROTECTING AGAINST AND/OR DEFENDING AN EMPLOYER LIABILITY CLAIM BASED ON HISTORICALLY ARCHIVED LOCKED NOTES

(75) Inventors: Carl J. Witkowski, Duryea, PA (US); John H. Richardson, Wilkes-Barre, PA (US)

(73) Assignee: Guard Insurance Group, Wilkes-Barre, PA (US)

( * ) Notice: Subject to any disclaimer, the term of this patent is extended or adjusted under 35 U.S.C. 154(b) by 251 days.

This patent is subject to a terminal disclaimer.

(21) Appl. No.: 12/700,153

(22) Filed: Feb. 4, 2010

(65) Prior Publication Data

US 2010/0138352 A1 Jun. 3, 2010

Related U.S. Application Data

(63) Continuation-in-part of application No. 11/164,730, filed on Dec. 2, 2005, now Pat. No. 7,668,828.

(51) Int. Cl.
*G06F 17/30* (2006.01)
(52) U.S. Cl. ...................................... 707/781
(58) Field of Classification Search .................. 707/781
See application file for complete search history.

(56) References Cited

U.S. PATENT DOCUMENTS

| 5,535,322 | A | * | 7/1996 | Hecht | 705/301 |
|---|---|---|---|---|---|
| 5,623,681 | A | * | 4/1997 | Rivette et al. | 715/255 |
| 6,279,014 | B1 | * | 8/2001 | Schilit et al. | 715/234 |
| 6,546,405 | B2 | * | 4/2003 | Gupta et al. | 715/233 |
| 6,622,128 | B1 | * | 9/2003 | Bedell et al. | 705/30 |
| 7,668,828 | B2 | * | 2/2010 | Richardson et al. | 707/661 |
| 7,860,868 | B2 | * | 12/2010 | Witkowski et al. | 707/740 |
| 7,860,869 | B2 | * | 12/2010 | Witkowski et al. | 707/740 |
| 2002/0107713 | A1 | * | 8/2002 | Hawkins | 705/8 |
| 2002/0133513 | A1 | * | 9/2002 | Townsend et al. | 707/500.1 |
| 2003/0046282 | A1 | | 3/2003 | Carlson et al. | |
| 2003/0074229 | A1 | | 4/2003 | Heise et al. | |
| 2003/0120588 | A1 | | 6/2003 | Dodd et al. | |
| 2003/0187699 | A1 | | 10/2003 | Bonissone et al. | |
| 2003/0187700 | A1 | | 10/2003 | Bonissone et al. | |
| 2005/0010454 | A1 | | 1/2005 | Falk et al. | |
| 2005/0234888 | A1 | | 10/2005 | Bailey et al. | |

FOREIGN PATENT DOCUMENTS

| JP | 62-88058 | 4/1987 |
|---|---|---|
| WO | WO 02/084520 | 10/2002 |

\* cited by examiner

*Primary Examiner* — Sheree Brown
(74) *Attorney, Agent, or Firm* — IP Authority, LLC; Ramraj Soundararajan (57) ABSTRACT

A system and method are disclosed to resolve, protect against and/or defend an employer liability claim. Input notes are received as formatted text and are stored in a database, wherein the stored text, after submission, are editable for a pre-determined time period and, after expiration of the pre-determined time period, the submission being non-editable and being locked in the database for historical archival. The locked notes are output as part of a judicial proceeding associated with the employer liability claim initiated by the employee, wherein the employer liability claim is resolved, protected against and/or defended based on the locked notes.

28 Claims, 6 Drawing Sheets

Created: Carl Witkowski - 04/21/2004 01:49pm  Category: Investigation  [edit] [delete]

Completed investigation, met with employee who agreed with findings (see earlier investigation note). Admitted no harm was found to exist relative to promotional opportunities.

FIG. 5

| DocuNotes | | | add new entry | printable view |
|---|---|---|---|---|
| Category Filter: | ☐ Interim Review<br>☐ Annual Review | ☒ Disciplinary Action<br>☐ Supervisory Conference | ☐ Attorney Consultation<br>☐ Investigation | |
| | | filter | | |
| Created: Carl Witkowski - 02/21/2004 03:00pm | | | | Category:Disciplinary Action |
| Met with employee to share information regarding his violation of company internet policy. He acknowledged unauthorized use. Employee was informed further infraction will result in termination. | | | | |
| Created: Carl Witkowski - 04/21/2004 01:49pm | | | | Category:Disciplinary Action |
| Met with employee to terminate employment. Shared data of his accessing unauthorized sites. He denied use, stating he felt he was being unfairly fired. Decision stands and termination completed. | | | | |

RESOLVING, PROTECTING AGAINST AND/OR DEFENDING AN EMPLOYER LIABILITY CLAIM BASED ON HISTORICALLY ARCHIVED LOCKED NOTES

RELATED APPLICATIONS

This application is a Continuation-In-Part of pending U.S. application Ser. No. 11/164,730 filed Dec. 2, 2005.

BACKGROUND OF THE INVENTION

1. Field of Invention

The present invention relates generally to employer liability claims. More specifically, the present invention is related to resolving, protecting against and/or defending an employer liability claim based on historically archived locked notes.

2. Discussion of Prior Art

The following references generally describe the prior art, but none of the references cited below teach the entry of notes for resolving, protecting against and/or defending an employer liability claim, wherein the notes, after submission, are stored is non-editable form and are locked in a database for historical archival. The following references also fail to teach or suggest the use of filters to categorize such notes, wherein the stored notes can be render based on a set of categories.

The patent to Schilit et al. (U.S. Pat. No. 6,279,014 B1), assigned to Xerox Corporation, provides for a system and method for extracting and organizing annotations made to a document on the basis of context and annotation attribute. The disclosed annotations are comprised of text, digital ink, audio, video, or any other input associated with a document.

The patent to Jones (WO 02/084520 A1), assigned to Pro-Super Holdings Limited, provides for a business tracking and communication system, wherein a business method is described for electronically handling claims, as well as underwriting policies. Also disclosed are user-edited notes that are inserted into an activities section of a policy.

The patent to Gupta et al. (U.S. Pat. No. 6,546,405 B2), assigned to Microsoft Corporation, provides for annotating temporally-dimensioned multimedia content. Disclosed is a system for annotating and displaying user-authored annotations in a multimedia document. Temporal annotations satisfying various are selected for inclusion into a multi-media document.

Whatever the precise merits, features, and advantages of the above cited references, none of them achieves or fulfills the purposes of the present invention.

SUMMARY OF THE INVENTION

The present invention provides for a method of resolving, protecting against and/or defending an employer liability claim, wherein the method comprises the steps of: (a) receiving notes input as formatted text; (b) storing the input notes in a database, wherein the stored text, after submission, are editable for a pre-determined time period and, after expiration of the pre-determined time period, the submission being non-editable and being locked in the database for historical archival; (c) outputting the locked notes as part of a judicial proceeding associated with the employer liability claim initiated by the employee; (d) resolving, protecting against and/or defending the employer liability claim based on the locked notes.

The present invention also provides for a method of resolving, protecting against and/or defending an employer liability claim, wherein the method comprises: (a) receiving a first note input as formatted text, wherein the first note comprises supervisory comments regarding a first disciplinary action associated with an employee; (b) storing the first note regarding the first disciplinary action in a database, wherein the stored text, after submission, are editable for a pre-determined time period and, after expiration of the pre-determined time period, the submission being non-editable and being locked in the database for historical archival; (c) receiving at least a second note input as formatted text, wherein the second note comprises supervisory comments regarding a second progressive disciplinary action associated with the same employee; (d) storing the second notes regarding the second progressive disciplinary action in the database, wherein the stored text, after the submission, are editable for a pre-determined time period and, after expiration of the pre-determined time period, the submission being non-editable and being locked in the database for historical archival; (e) outputting the first and second note as part of a judicial proceeding associated with the employer liability claim initiated by the employee; (f) resolving, protecting against and/or defending the employer liability claim based on the locked notes.

The present invention also provides for a method of resolving, protecting against and/or defending an employer liability claim, wherein the method comprises: (a) receiving notes input as formatted text; (b) storing the input notes in a database, wherein the stored text, after submission, are editable for a pre-determined time period and, after expiration of the pre-determined time period, the submission being non-editable and being locked in the database for historical archival; (c) implementing one or more filters, each of the filters categorizing the stored notes based on a set of categories; (d) receiving inputs identifying at least one filter; (e) filtering the stored notes based on the identified at least one filter; (f) outputting categorized locked notes corresponding to the identified filters as part of a judicial proceeding associated with the employer liability claim initiated by the employee; and (g) resolving, protecting against and/or defending the employer liability claim based on the locked notes.

The present invention also provides an article of manufacture having computer readable storage medium having instructions executable by a processor to implement each of the above-mentioned methods.

The present invention also provides for a computer based system to resolve, protect against and/or defend an employer liability claim, wherein the system comprises: (a) a processor; (b) computer readable storage medium having instructions executable by the processor; and wherein the processor executes a plurality of instructions to implement each of the above-mentioned methods.

BRIEF DESCRIPTION OF THE DRAWINGS

FIG. 6 illustrates a non-exhaustive list of the various categories that a user can choose from.

DESCRIPTION OF THE PREFERRED EMBODIMENTS

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Figure 1:
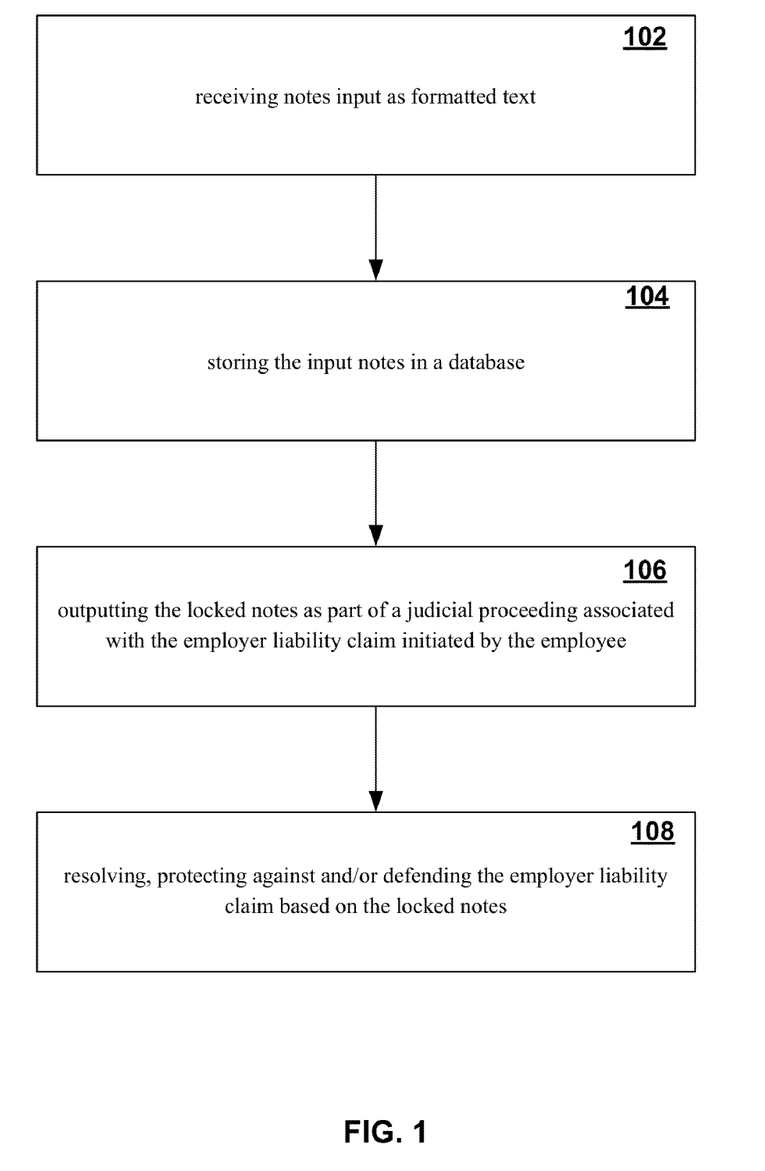
FIG. 1 through FIG. 3 illustrates various embodiments of the present invention for resolving, protecting against and/or defending an employer liability claim.

FIG. 1 illustrates one embodiment of the present invention's method of resolving, protecting against and/or defending an employer liability claim, wherein the method of FIG. 1 comprises the steps of: (a) receiving notes (non-limiting examples of such notes include, but are not limited to, any of the following: note related to an interim review, note related to an annual review, note related to a disciplinary action, note related to a supervisory conference, note related to an attorney consultation, or note related to an investigation, such as (but not limited to) a sexual harassment investigation) input as formatted text 102; (b) storing the input notes in a database 104, wherein the stored text, after submission, are editable for a pre-determined time period and, after expiration of the pre-determined time period, the submission being non-editable and being locked in the database for historical archival; (c) outputting the locked notes as part of a judicial proceeding associated with the employer liability claim initiated by the employee 106; (d) resolving, protecting against and/or defending the employer liability claim based on the locked notes 108.

Figure 2:
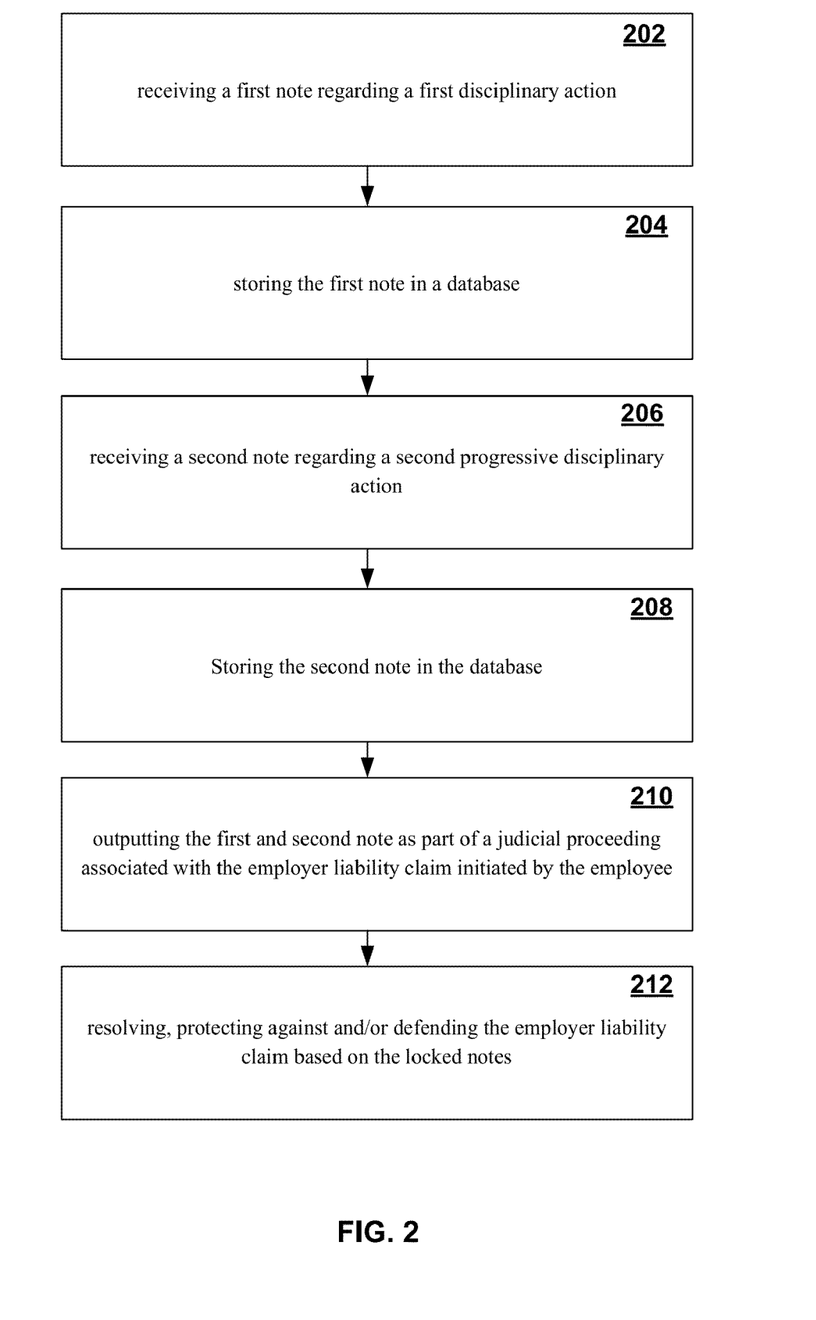

FIG. 2 illustrates another embodiment of the present invention's method of resolving, protecting against and/or defending an employer liability claim, wherein the method of FIG. 2 comprises: (a) receiving a first note (non-limiting examples of such notes include, but are not limited to, any of the following: note related to an interim review, note related to an annual review, note related to a disciplinary action, note related to a supervisory conference, note related to an attorney consultation, or note related to an investigation, such as (but not limited to) a sexual harassment investigation) input as formatted text, wherein the first note comprises supervisory comments regarding a first disciplinary action associated with an employee 202; (b) storing the first note regarding the first disciplinary action in a database 204, wherein the stored text, after submission, are editable for a pre-determined time period and, after expiration of the pre-determined time period, the submission being non-editable and being locked in the database for historical archival; (c) receiving at least a second note input as formatted text 206, wherein the second note comprises supervisory comments regarding a second progressive disciplinary action (i.e., a second disciplinary action following a first disciplinary action) associated with the same employee; (d) storing the second notes regarding the second progressive disciplinary action in the database 208, wherein the stored text, after the submission, are editable for a pre-determined time period and, after expiration of the pre-determined time period, the submission being non-editable and being locked in the database for historical archival; (e) outputting the first and second note as part of a judicial proceeding associated with the employer liability claim initiated by the employee 210; (f) resolving, protecting against and/or defending the employer liability claim based on the locked notes 212.

Figure 3:
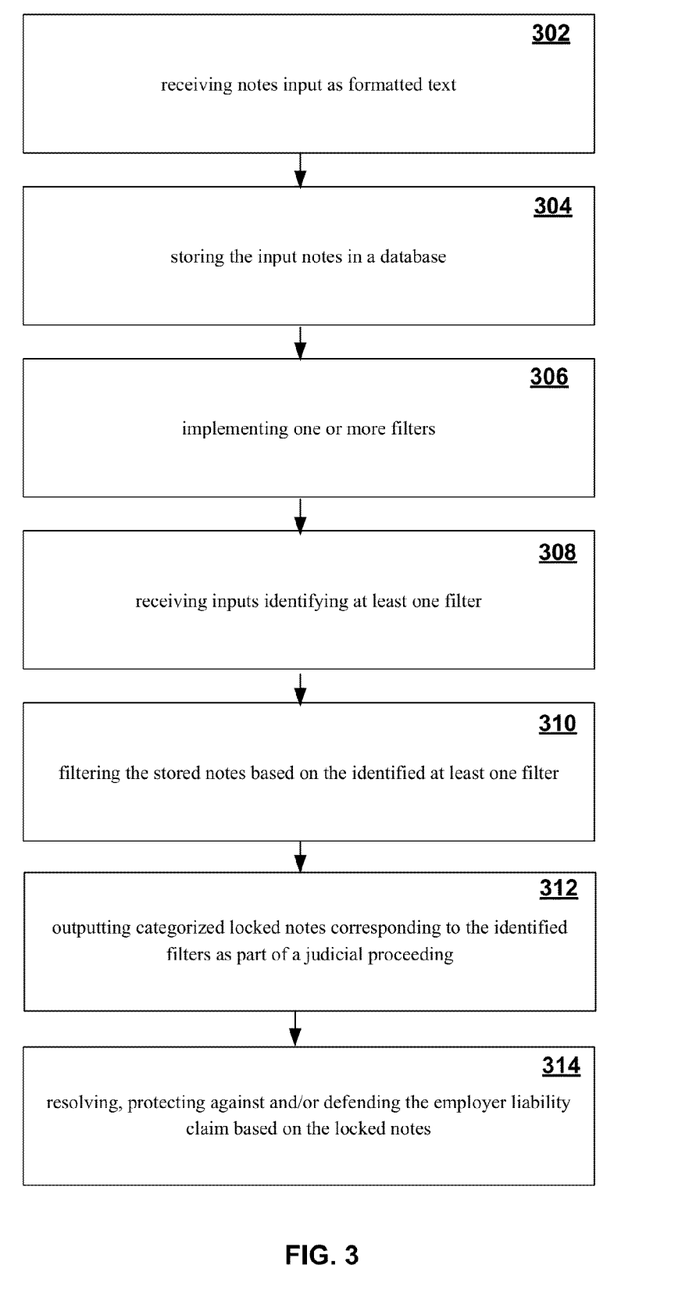

FIG. 3 illustrates yet another embodiment of the present invention's method of resolving, protecting against and/or defending an employer liability claim, wherein the method comprises: (a) receiving notes (non-limiting examples of such notes include, but are not limited to, any of the following: note related to an interim review, note related to an annual review, note related to a disciplinary action, note related to a supervisory conference, note related to an attorney consultation, or note related to an investigation, such as (but not limited to) a sexual harassment investigation) input as formatted text 302; (b) storing the input notes in a database 304, wherein the stored text, after submission, are editable for a pre-determined time period and, after expiration of the pre-determined time period, the submission being non-editable and being locked in the database for historical archival; (c) implementing one or more filters 306, each of the filters categorizing the stored notes based on a set of categories (non-limiting examples of such categories include (but are not limited to): interim review, annual review, disciplinary action, supervisory conference, attorney consultation, or investigation (e.g., a sexual harassment investigation)); (d) receiving inputs identifying at least one filter 308; (e) filtering the stored notes based on the identified at least one filter 310; (f) outputting categorized locked notes corresponding to the identified filters as part of a judicial proceeding associated with the employer liability claim initiated by the employee 312; and (g) resolving, protecting against and/or defending the employer liability claim based on the locked notes 314.

The present invention also provides an article of manufacture having computer readable storage medium having instructions executable by a processor to implement each of the above-mentioned methods.

The present invention also provides for a computer based system to resolve, protect against and/or defend an employer liability claim, wherein the system comprises: (a) a processor; (b) computer readable storage medium having instructions executable by the processor; and wherein the processor executes a plurality of instructions to implement each of the above-mentioned methods.

Figure 4A:
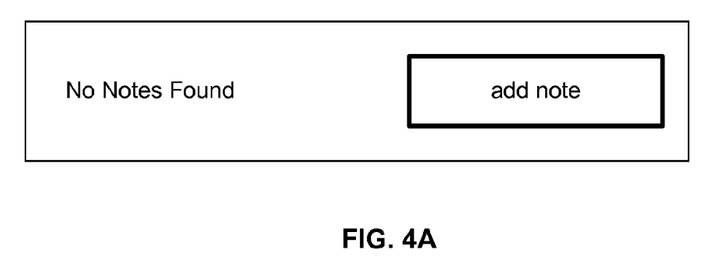
FIG. 4A and FIG. 4B illustrate an example of how a first note is added as per the present invention.
Figure 4B:
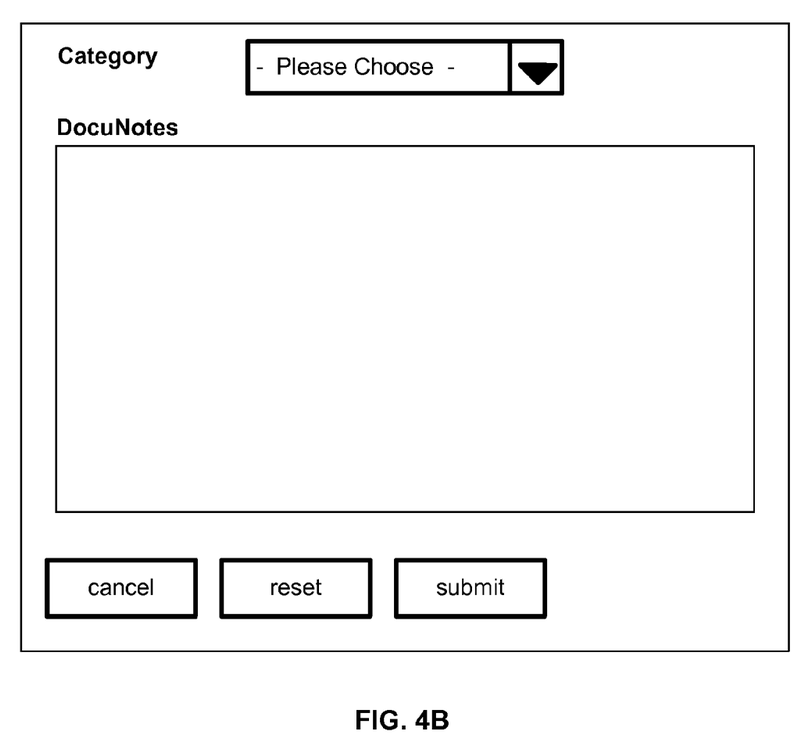

FIGS. 4A and 4B illustrate an example of how a first note is added as per the present invention. First, in FIG. 4A, a user clicks on an 'add note' button and, in FIG. 4B, the user selects a note category (non-limiting examples of such categories include (but are not limited to): interim review, annual review, disciplinary action, supervisory conference, attorney consultation, or investigation (e.g., a sexual harassment investigation)) from the category drop down list. The user, then, enters notes in the text box. Once the text is entered, the user clicks the 'submit' button or a tab to the button and presses Enter. Clicking the reset key deletes the text the user entered. If the user does not wish to make a change, the user clicks the 'cancel' button.

Figure 5:
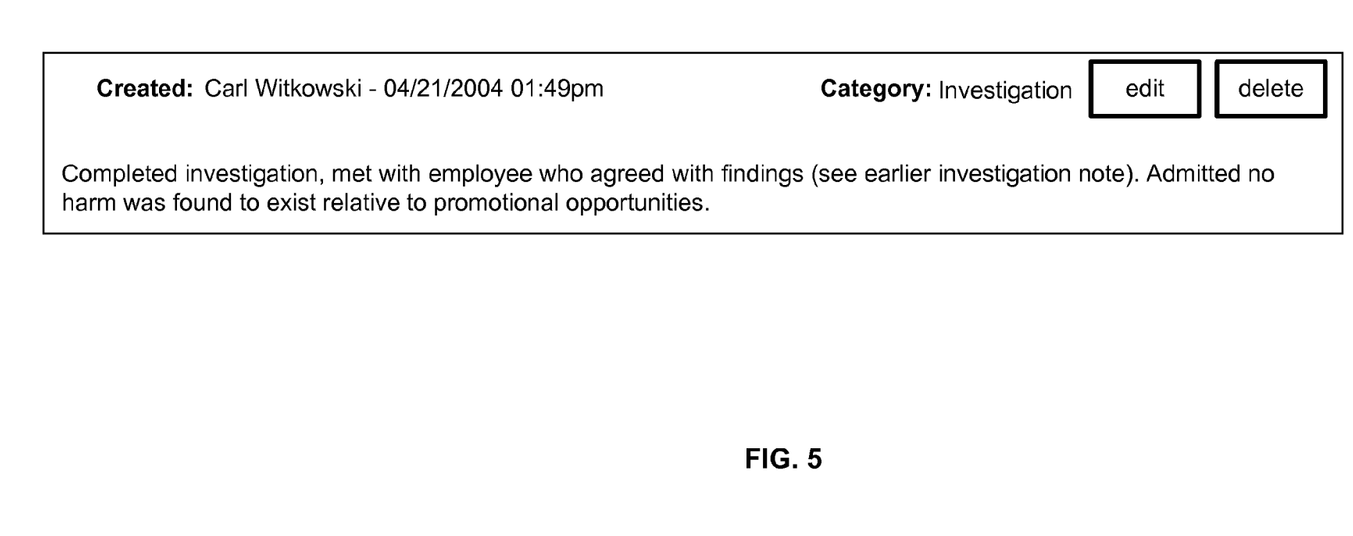
FIG. 5 illustrates the process of adding a new note according to the present invention.

FIG. 5 illustrates the process of adding a new note according to the present invention. First, the user clicks on the 'add new entry' button. Next, the user enters notes in the text box area. After entering the text, the user clicks the 'submit' button. Alternatively, the user can click reset to delete the text entered, or, if the user does not wish to make a change, the user clicks the 'cancel' button. In one embodiment, one may use the outside scroll bar to view previous notes while entering a new note.

All notes that were previously created appear in the Diaries section as shown in FIG. 5. As shown in FIG. 5, the most recent note entered is at the top of the list. To view more notes (when there is more than one note), the user can scroll down the page.

It should be noted that all new notes are assigned a category (non-limiting examples include (but are not limited to): interim review, annual review, disciplinary action, supervisory conference, attorney consultation, or investigation (e.g., a sexual harassment investigation)) by the person entering the note. It is also possible to assign a "No Category" affiliation to a note.

Figure 6:
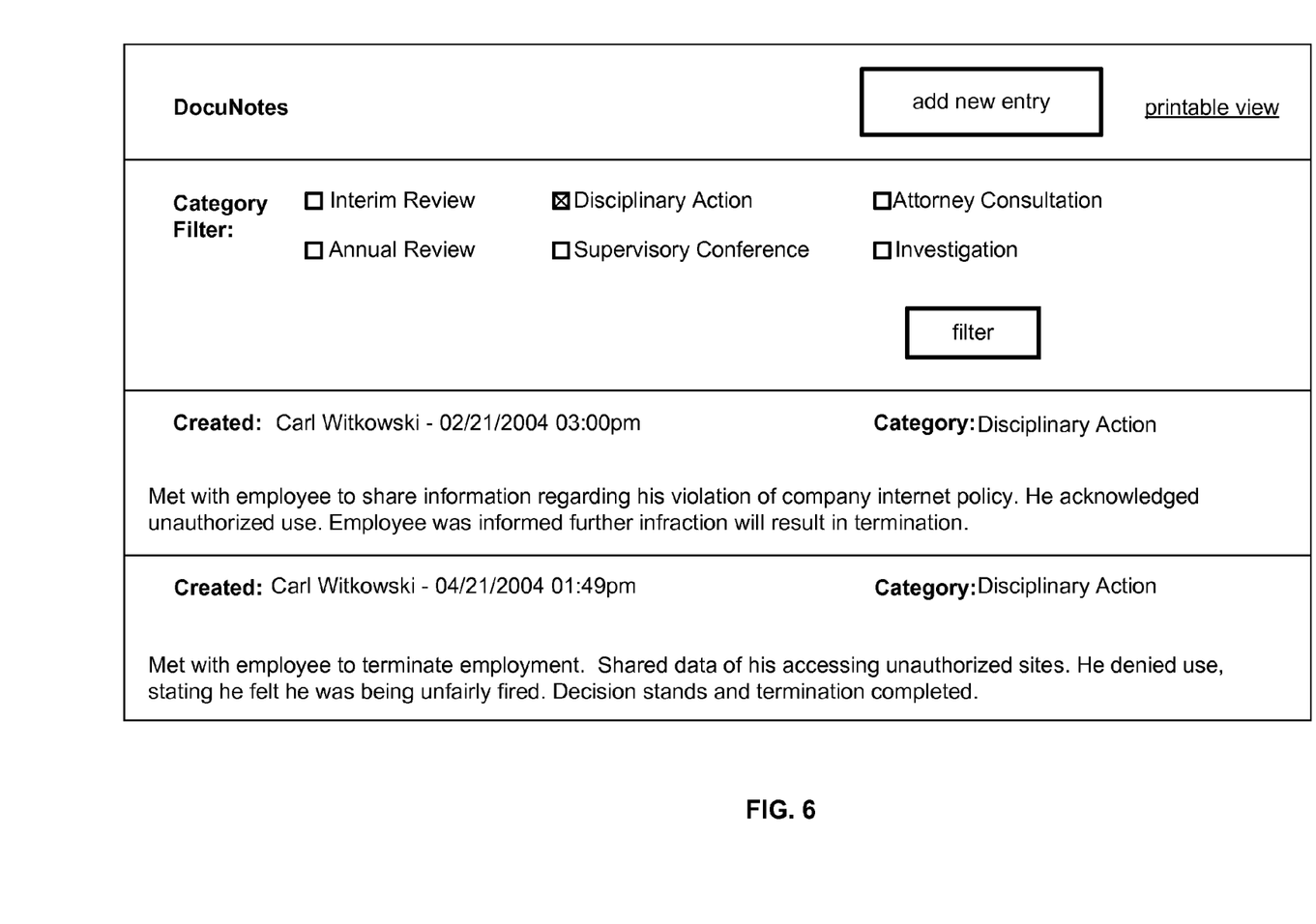

FIG. 6 illustrates a non-exhaustive list of the various categories that a user can choose from. Non-limiting examples include (but are not limited to): interim review, annual review, disciplinary action, supervisory conference, attorney consultation, or investigation (e.g., a sexual harassment investigation). Although the specification provides various non-limiting examples of what these categories may be, it should be noted that this should in no way be considered an exhaustive listing of categories, as one of ordinary skill in the art would envision other categories within a workplace scenario. To view notes for a specific category, users clicks the box next to the category or categories of notes (in the Category Filter section) they need to view (e.g., interim review). Pressing the filter button allows the notes to be filtered based on the selected category or categories.

In the example shown in FIG. 6, it can be seen that there are two notes belonging to the category of "Disciplinary Action", wherein the first note indicates that the employee was informed of a violation of company policy and the second note indicates that when the same employee repeated the violation, he was terminated. These actions have been archived in a database where they cannot be edited. At a later stage, should an employer liability claim be filed, these locked notes can be used as part of a legal proceedings to resolve, protect against and/or defend the employer liability claim.

In one embodiment, notes may be edited or deleted within a pre-set time period (e.g., 72 hours) after they are entered. To edit, the user clicks the 'edit' button next to the note you need to edit and the user is able to edit the note as necessary. After editing the text, the user clicks the 'submit' button. Users are also able to delete a note. In an extended embodiment, once a note is deleted, it cannot be restored. After the pre-set time period has passed, the notes are not editable and cannot be deleted as they are stored in non-editable form in a database for historical archival.

The following must be completed for each new note:
Category
Diary text
Every note entry includes the name of the user who added the note and the date the note was created. As mentioned above, in one embodiment, the notes are editable and can be deleted for a pre-set period of time (e.g., notes cannot be deleted or edited more than 72 hours after they are added), after which the notes are not editable and cannot be deleted as they are stored in non-editable form for historical archival. In an extended embodiment, once a note is deleted, it cannot be restored. Text may be copied and pasted into a new Note. It should be noted that a user cannot perform an insert operation without selecting a category.

The present invention also provides for a set of interfaces receiving note submissions and rendering notes based on one or more filters. The interfaces comprises: a first interface to submit notes as formatted text (e.g., notes associated with an interim review, an annual review, a disciplinary action, a supervisory conference, an attorney consultation, or an investigation), wherein the notes, after submission, are locked and stored in non-editable form in a database for historical archival; a second interface to select one or more filters, wherein each of the filters allow categorization of the stored locked and non-editable notes based on a set of categories; and a third interface to render, based on a selection of at least one filter, categorized notes based on a set of categories corresponding to said at least one selected filter The present invention also provides for a set of interfaces receiving note submissions and rendering notes based on one or more filters. The interfaces comprises: a first interface to submit notes as formatted text (e.g., notes associated with an interim review, an annual review, a disciplinary action, a supervisory conference, an attorney consultation, or an investigation), wherein the notes, after submission, are editable only for a pre-set time period and after the expiration of the pre-set time period, the notes are locked and stored in non-editable form in a database for historical archival; a second interface to select one or more filters, wherein each of the filters allow categorization of the stored locked and non-editable notes based on a set of categories; and a third interface to render, based on a selection of at least one filter, categorized notes based on a set of categories corresponding to said at least one selected filter.

Additionally, the present invention provides for an article of manufacture comprising computer readable program code contained within implementing one or more modules to implement a computer-implemented electronic diary for entry of notes that are used to resolve, protect against and/or defend an employer liability claim. Furthermore, the present invention includes a computer program code-based product, which is a storage medium having program code stored therein which can be used to instruct a computer to perform any of the methods associated with the present invention. The computer storage medium includes any of, but is not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, or any other appropriate static or dynamic memory or data storage devices.

Conclusion

A system and method has been shown in the above embodiments for resolving, protecting against and/or defending an employer liability claim based on historically archived locked notes. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, specific computing hardware, or specific category.

The above enhancements are implemented in various computing environments. For example, the present invention may be implemented on a conventional PC or equivalent, multi-nodal system (e.g., LAN) or networking system (e.g., Internet, WWW, wireless web). All programming and data related thereto are stored in computer memory, static or dynamic, and may be retrieved by the user in any of: conventional computer storage, display (i.e., CRT) and/or hardcopy (i.e., printed) formats. The programming of the present invention may be implemented by one of skill in the art of database programming.

The invention claimed is:

1. An article of manufacture having computer readable storage medium having instructions executable by a processor to implement a method of resolving, protecting against and/or defending an employer liability claim, said method implemented by a processor comprising:

executing instructions to receive notes submitted as formatted text;

executing instructions to store said submitted notes in a database, said stored text, after said submission, are editable for a pre-determined time period and, after expiration of said pre-determined time period, said submission is non-editable and is locked in said database for historical archival;

executing instructions to implement one or more filters, each of said filters categorizing said locked notes based on a set of categories;

executing instructions to receive inputs identifying at least one filter, said filter associated with a judicial proceeding;

executing instructions to filter said stored locked notes based on said identified at least one filter associated with said judicial proceeding;

executing instructions to output said locked notes as part of said judicial proceeding associated with said employer liability claim initiated by said employee; and executing instructions to resolve, protect against and/or defend said employer liability claim based on said locked notes.

2. The article of manufacture of claim 1, wherein said submitted notes relate to any of the following: a note associated with a performance review or a note by human resource personnel.

3. The article of manufacture of claim 1, wherein said locked notes is accessible over a network.

4. The article of manufacture of claim 2, wherein said network is any of the following: local area network, wide area network, or the Internet.

5. An article of manufacture having computer readable storage medium having instructions executable by a processor to implement a method of resolving, protecting against and/or defending an employer liability claim, said method implemented by a processor comprising:

executing instructions to receive a first note submitted as formatted text, said first note comprising supervisory comments regarding a first disciplinary action associated with an employee;

executing instructions to store said first notes regarding said first disciplinary action in a database, said stored text, after said submission, are editable for a pre-determined time period and, after expiration of said pre-determined time period, said submission is non-editable and is locked in said database for historical archival;

executing instructions to receive at least a second note submitted as formatted text, said second note comprising supervisory comments regarding a second progressive disciplinary action associated with said employee;

executing instructions to store said second notes regarding said second progressive disciplinary action in said database, said stored text, after said submission, are editable for a pre-determined time period and, after expiration of said pre-determined time period, said submission is non-editable and is locked in said database for historical archival;

executing instructions to implement one or more filters, each of said filters categorizing said locked notes based on a set of categories;

executing instructions to receive inputs identifying at least one filter, said filter associated with a judicial proceeding;

executing instructions to filter said stored locked notes based on said identified at least one filter associated with said judicial proceeding;

executing instructions to output said first and second note as part of said judicial proceeding associated with said employer liability claim initiated by said employee; and executing instructions to resolve, protect against and/or defend said employer liability claim based on said locked notes.

6. The article of manufacture of claim 5, wherein said submitted notes relate to any of the following: a note associated with a performance review or a note by human resource personnel.

7. The article of manufacture of claim 5, wherein said locked notes is accessible over a network.

8. The article of manufacture of claim 7, wherein said network is any of the following: local area network, wide area network, or the Internet.

9. An article of manufacture having computer readable storage medium having instructions executable by a processor to implement a method of resolving, protecting against and/or defending an employer liability claim, said method implemented by a processor comprising:

executing instructions to receive notes submitted as formatted text;

executing instructions to store said submitted notes in a database, said stored text, after said submission, are editable for a pre-determined time period and, after expiration of said pre-determined time period, said submission is non-editable and is locked in said database for historical archival;

executing instructions to implement one or more filters, each of said filters categorizing said stored notes based on a set of categories;

executing instructions to receive inputs identifying at least one filter, said filter associated with a judicial proceeding;

executing instructions to filter said stored notes based on said identified at least one filter associated with said judicial proceeding;

executing instructions to output categorized locked notes corresponding to said identified filters as part of said judicial proceeding associated with said employer liability claim initiated by said employee; and executing instructions to resolve, protect against and/or defend said employer liability claim based on said locked notes.

10. The article of manufacture of claim 9, wherein said submitted notes relate to any of the following: a note associated with a performance review or a note by human resource personnel.

11. The article of manufacture of claim 9, wherein said categories include any of the following: interim review, annual review, disciplinary action, supervisory conference, attorney consultation, or investigation.

12. The article of manufacture of claim 9, wherein said notes are associated with any of the following: interim review, annual review, disciplinary action, supervisory conference, attorney consultation, or investigation.

13. The article of manufacture of claim 9, wherein said locked notes is accessible over a network.

14. The article of manufacture of claim 13, wherein said network is any of the following: local area network, wide area network, or the Internet.

15. A computer based system to resolve, protect against and/or defend an employer liability claim, wherein the system comprises:

(a) a processor;

(b) computer readable storage medium having instructions executable by said processor; and said processor:

executing instructions to receive a first note submitted as formatted text, said first note comprising supervisory comments regarding a first disciplinary action associated with an employee;

executing instructions to store said first notes regarding said first disciplinary action in a database, said stored text, after said submission, are editable for a pre-determined time period and, after expiration of said pre-determined time period, said submission is non-editable and is locked in said database for historical archival;

executing instructions to receive at least a second note submitted as formatted text, said second note comprising supervisory comments regarding a second progressive disciplinary action associated with said employee;

executing instructions to store said second notes regarding said second progressive disciplinary action in said database, said stored text, after said submission, are editable for a pre-determined time period and, after expiration of said pre-determined time period, said submission is non-editable and is locked in said database for historical archival;

executing instructions to implement one or more filters, each of said filters categorizing said locked notes based on a set of categories;

executing instructions to receive inputs identifying at least one filter, said filter associated with a judicial proceeding;

executing instructions to filter said stored locked notes based on said identified at least one filter associated with said judicial proceeding;

executing instructions to output said first and second note as part of a judicial proceeding associated with said employer liability claim initiated by said employee; and executing instructions to resolve, protect against and/or defend said employer liability claim based on said locked notes.

16. The system of claim 15, wherein said submitted notes relate to any of the following: a note associated with a performance review or a note by human resource personnel.

17. The system of claim 15, wherein said locked notes is accessible over a network.

18. The system of claim 17, wherein said network is any of the following:
local area network, wide area network, or the Internet.

19. A computer based system to resolve, protect against and/or defend an employer liability claim, wherein the system comprises:
(a) a processor;
(b) computer readable storage medium having instructions executable by said processor; and
said processor:
executing instructions to receive notes submitted as formatted text;
executing instructions to store said submitted notes in a database, said stored text, after said submission, are editable for a pre-determined time period and, after expiration of said pre-determined time period, said submission is non-editable and is locked in said database for historical archival;
executing instructions to implement one or more filters, each of said filters categorizing said stored notes based on a set of categories;
executing instructions to receive inputs identifying at least one filter, said identified at least filter associated with a judicial proceeding;
executing instructions to filter said stored notes based on said identified at least one filter associated with a judicial proceeding;
executing instructions to output categorized locked notes corresponding to said identified filters as part of said judicial proceeding associated with said employer liability claim initiated by said employee; and
executing instructions to resolve, protect against and/or defend said employer liability claim based on said locked notes.

20. The system of claim 19, wherein said submitted notes relate to any of the following: a note associated with a performance review or a note by human resource personnel.

21. The system of claim 19, wherein said locked notes is accessible over a network.

22. The system of claim 21, wherein said network is any of the following:
local area network, wide area network, or the Internet.

23. The system of claim 19, wherein said categories include any of the following: interim review, annual review, disciplinary action, supervisory conference, attorney consultation, or investigation.

24. The system of claim 19, wherein said notes are associated with any of the following: interim review, annual review, disciplinary action, supervisory conference, attorney consultation, or investigation.

25. A computer based system to resolve, protect against and/or defend an employer liability claim, wherein the system comprises:
(a) a processor;
(b) computer readable storage medium having instructions executable by said processor; and
said processor:
executing instructions to receive notes submitted as formatted text;
executing instructions to store said submitted notes in a database, said stored text, after said submission, are editable for a pre-determined time period and, after expiration of said pre-determined time period, said submission is non-editable and is locked in said database for historical archival;
executing instructions to implement one or more filters, each of said filters categorizing said locked notes based on a set of categories;
executing instructions to receive inputs identifying at least one filter, said filter associated with a judicial proceeding;
executing instructions to filter said stored locked notes based on said identified at least one filter associated with said judicial proceeding;
executing instructions to output said locked notes as part of said judicial proceeding associated with said employer liability claim initiated by said employee; and
executing instructions to resolve, protect against and/or defend said employer liability claim based on said locked notes.

26. The system of claim 25, wherein said submitted notes relate to any of the following: a note associated with a performance review or a note by human resource personnel.

27. The system of claim 25, wherein said locked notes is accessible over a network.

28. The system of claim 27, wherein said network is any of the following:
local area network, wide area network, or the Internet.

* * * * *